US012553665B1

(12) United States Patent
Gelbart et al.

(10) Patent No.: US 12,553,665 B1
(45) Date of Patent: Feb. 17, 2026

(54) VACUUM OVEN

(71) Applicant: 2422353 Ontario Limited, Hampton (CA)

(72) Inventors: Daniel Gelbart, Vancouver (CA); Wayne Ernest Conrad, Hampton (CA)

(73) Assignee: 2422353 Ontario Limited, Hampton (CA)

( * ) Notice: Subject to any disclaimer, the term of this patent is extended or adjusted under 35 U.S.C. 154(b) by 0 days.

(21) Appl. No.: 19/088,554

(22) Filed: Mar. 24, 2025

(51) Int. Cl.
*F27B 5/04* (2006.01)
*F27D 7/06* (2006.01)

(52) U.S. Cl.
CPC .................. *F27B 5/04* (2013.01); *F27D 7/06* (2013.01); *F27D 2007/066* (2013.01)

(58) Field of Classification Search
CPC ........ F27B 5/04; F27D 7/06; F27D 2007/066; F27D 1/18; F27D 99/0073
See application file for complete search history.

(56) References Cited

U.S. PATENT DOCUMENTS

| | | | | |
|---|---|---|---|---|
| 9,109,958 | B2 * | 8/2015 | Katsumata | F27D 15/02 |
| 2014/0030667 | A1 * | 1/2014 | Woods | B23K 28/003 432/120 |
| 2018/0112812 | A1 | 4/2018 | Takahashi | |
| 2020/0171569 | A1 | 6/2020 | Gelbart | |
| 2022/0260314 | A1 | 8/2022 | Gelbart et al. | |
| 2025/0020405 | A1 * | 1/2025 | Barsky | F27B 5/04 |

FOREIGN PATENT DOCUMENTS

| | | | | |
|---|---|---|---|---|
| CN | 112432499 | A * | 3/2021 | B01D 46/10 |
| CN | 118241298 | A * | 6/2024 | C30B 1/12 |
| CN | 118996322 | A * | 11/2024 | C23C 8/22 |
| WO | 2006086869 | A1 | 8/2006 | |

OTHER PUBLICATIONS

English translation of CN-112432499-A, dated May 30, 2025 (Year: 2025).*
English translation of CN-118241298-A, dated May 30, 2025 (Year: 2025).*
English translation of CN-118996322-A, dated May 30, 2025 (Year: 2025).*

* cited by examiner

*Primary Examiner* — Edelmira Bosques
*Assistant Examiner* — Brett Peterson Mallon
(74) *Attorney, Agent, or Firm* — Philip C. Mendes Da Costa; SMART & BIGGAR LP

(57) ABSTRACT

A vacuum oven has a furnace chamber provided in a thermally insulated housing and a retort located within the furnace chamber. The retort has an open end and an opposed distal end. The vacuum oven has a door moveable between a closed position in which the open end of the retort is closed and an open position in which the retort is accessible. The door has a thermally insulated outer side and an inner seal which, when the door is in the closed position, closes the open end of the retort. The vacuum oven has a heating element. The seal includes a compressible graphite. In operation at steady state condition, the distal end of the retort is at a first temperature and the open end is at a second temperature. The second temperature is at least 85% of the first temperature and the first temperature is over 1,000° C.

23 Claims, 4 Drawing Sheets

VACUUM OVEN

FIELD

This disclosure relates generally to a vacuum oven. In a preferred embodiment, the vacuum oven comprises a high-temperature vacuum oven.

INTRODUCTION

The following is not an admission that anything discussed below is part of the prior art or part of the common general knowledge of a person skilled in the art.

A high-temperature vacuum oven is a specialized piece of equipment used for heat treatment processes in a vacuum environment at high temperatures. Various types of high-temperature vacuum ovens are known, including vertical vacuum ovens, horizontal vacuum ovens, box vacuum ovens, rotary vacuum ovens, vacuum induction ovens, and vacuum sintering ovens.

SUMMARY

This summary is intended to introduce the reader to the more detailed description that follows and not to limit or define any claimed or as yet unclaimed invention. One or more inventions may reside in any combination or sub-combination of the components or process steps disclosed in any part of this document including its claims and figures.

In accordance with one aspect of this disclosure, which may be used alone or in combination with one or more other aspects, a vacuum oven includes:

(a) a furnace chamber provided in a thermally insulated housing;

(b) a retort which, in operation, is located within the furnace chamber, the retort having an open end and an opposed distal end;

(c) a door moveable between a closed position in which the open end of the retort is closed and an open position in which the retort is accessible, the door having an outer side wherein the outer side of the door is thermally insulated;

(d) an inner seal which, when the door is in the closed position, closes the open end of the retort; and, (e) a heating element, wherein the seal includes a compressible graphite, and wherein, in operation at steady state condition, the distal end of the retort is at a first temperature and the open end of the retort is at a second temperature, the second temperature is at least 85% of the first temperature and the first temperature is over 1,000° C.

These and other aspects and features of various embodiments will be described in greater detail below.

BRIEF DESCRIPTION OF THE DRAWINGS

For a better understanding of the described embodiments and to show more clearly how they may be carried into effect, reference will now be made, by way of example, to the accompanying drawings in which.

Figure 1:
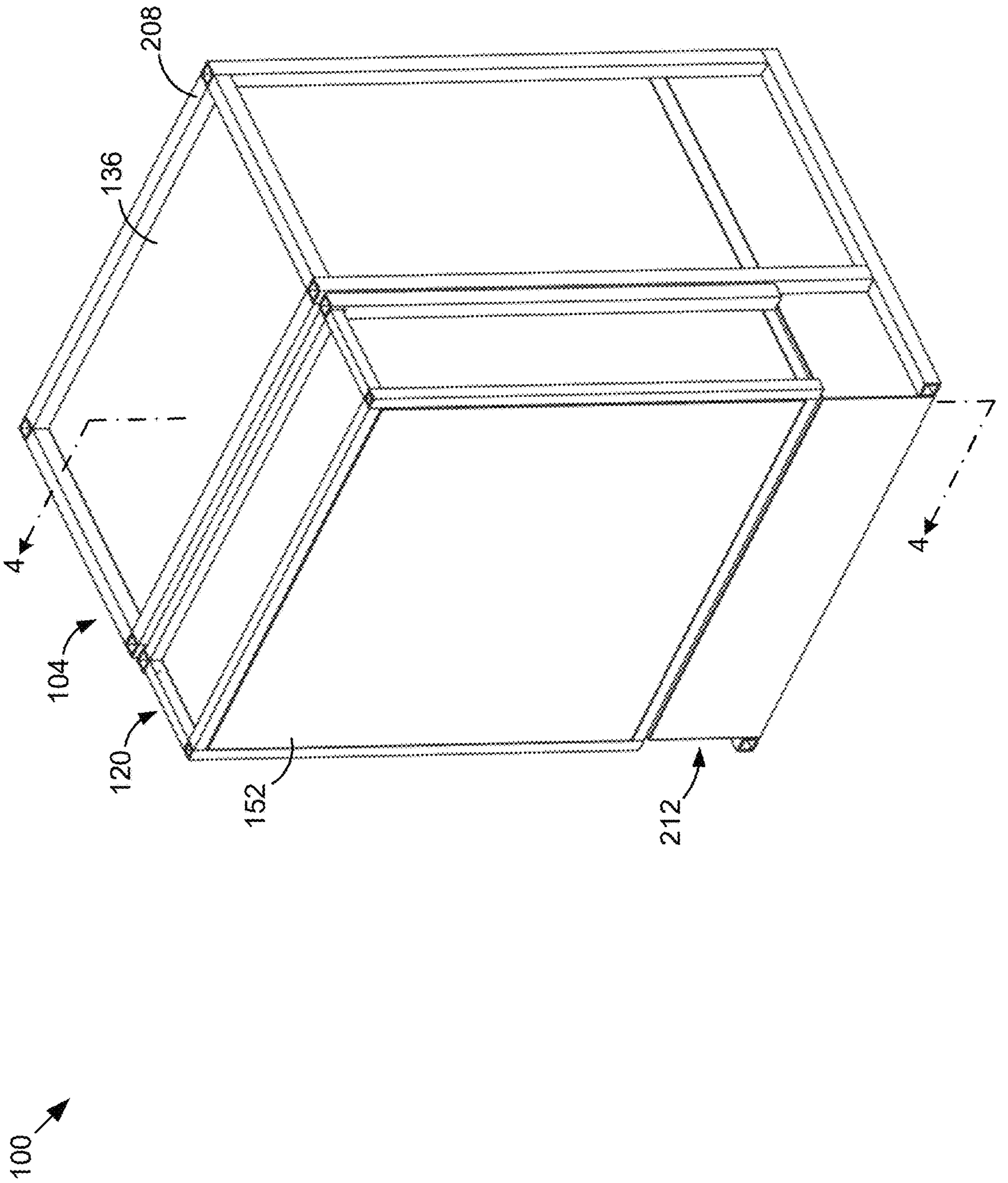
FIG. 1 is a perspective view of an example vacuum oven, in accordance with an embodiment, with a door in a closed position.

The drawings included herewith are for illustrating various examples of articles, methods, and apparatuses of the teaching of the present specification and are not intended to limit the scope of what is taught in any way.

DESCRIPTION OF VARIOUS EMBODIMENTS

Various apparatus, methods and compositions are described below to provide an example of an embodiment of each claimed invention. No embodiment described below limits any claimed invention and any claimed invention may cover apparatuses and methods that differ from those described below. The claimed inventions are not limited to apparatus, methods and compositions having all of the features of any one apparatus, method or composition described below or to features common to multiple or all of the apparatus, methods or compositions described below. It is possible that an apparatus, method or composition described below is not an embodiment of any claimed invention. Any invention disclosed in an apparatus, method or composition described below that is not claimed in this document may be the subject matter of another protective instrument, for example, a continuing patent application, and the applicant(s), inventor(s) and/or owner(s) do not intend to abandon, disclaim, or dedicate to the public any such invention by its disclosure in this document.

The terms "an embodiment", "embodiment", "embodiments", "the embodiment", "the embodiments", "one or more embodiments," "some embodiments", and "one embodiment" mean "one or more (but not all) embodiments of the present invention(s)", unless expressly specified otherwise.

The terms "including", "comprising", and variations thereof mean "including but not limited to", unless expressly specified otherwise. A listing of items does not imply that any or all of the items are mutually exclusive, unless expressly specified otherwise. The terms "a", "an", and "the" mean "one or more", unless expressly specified otherwise.

As used herein and in the claims, two or more parts are said to be "coupled", "connected", "attached", or "fastened" where the parts are joined or operate together either directly or indirectly (i.e., through one or more intermediate parts), so long as a link occurs. As used herein and in the claims, two or more parts are said to be "directly coupled", "directly connected", "directly attached", or "directly fastened" where the parts are connected in physical contact with each other. None of the terms "coupled", "connected", "attached", and "fastened" distinguish the manner in which two or more parts are joined together.

Furthermore, it will be appreciated that for simplicity and clarity of illustration, where considered appropriate, reference numerals may be repeated among the figures to indicate corresponding or analogous components. In addition, numerous specific details are set forth in order to provide a thorough understanding of the example embodiments described herein. However, it will be understood by those of ordinary skill in the art that the example embodiments described herein may be practiced without these specific details. In other instances, well-known methods, procedures, and components have not been described in detail so as not to obscure the example embodiments described herein. Also, the description is not to be considered as limiting the scope of the example embodiments described herein.

As used herein, the wording "and/or" is intended to represent an inclusive—or. That is, "X and/or Y" is intended to mean X or Y or both, for example. As a further example, "X, Y, and/or Z" is intended to mean X or Y or Z or any combination thereof.

As used herein and in the claims, two components are said to be "parallel" where those components are parallel and spaced apart, or where those components are collinear.

Some components herein may be identified by a part number, which is composed of a base number followed by an alphabetical or subscript-numerical suffix (e.g., 300*a*, or $\mathbf{300}_1$). Multiple components herein may be identified by part numbers that share a base number in common and that differ by their suffixes (e.g., $\mathbf{300}_1$, $\mathbf{300}_2$, and $\mathbf{300}_3$). All components with a common base number may be referred to collectively or generically using the base number without a suffix (e.g., 300).

It should be noted that terms of degree such as "substantially", "about", and "approximately" as used herein mean a reasonable amount of deviation of the modified term such that the end result is not significantly changed. These terms of degree may also be construed as including a deviation of the modified term, such as by 1%, 2%, 5% or 10%, for example, if this deviation does not negate the meaning of the term it modifies. For example, the expressions "substantially perpendicular" and "substantially parallel" mean within 10% of perpendicular and parallel, respectively.

A high-temperature vacuum oven is a specialized piece of equipment used for heat treatment processes in a vacuum environment at temperatures typically above 1,000° C. (1,832° F.).

There are existing vacuum ovens have a cold zone near the oven door. The purpose of the cold zone is to allow an elastomeric door seal to be placed at the oven door to stop oxygen and other gasses from entering the oven and to maintain the vacuum within the oven. The door seals are typically made from high-temperature elastomers such as silicone rubber or fluorinated elastomers such as Viton, which can only tolerate a temperature up to about 300° C. (572° F.).

However, a cold zone near the oven door has several disadvantages. For example, a cold zone leads to a temperature gradient inside the oven. A temperature gradient may result in uneven heat distribution across the contents of the oven. Consequentially, a temperature gradient may cause inconsistencies/deficiencies in heat treatment processes taking place within the oven. A temperature gradient may also induce high stresses in the materials of the oven. Consequentially, a temperature gradient may lead to cracking or other damage to the material(s) of the oven. A temperature gradient may thus necessitate the use of higher cost materials for the oven that can withstand the stresses induced by the temperature gradient. A cold zone also results in loss of heat. Consequentially, a cold zone near the oven door may increase power demand for the oven's heating system to maintain the interior of the oven at temperature.

As a high-temperature vacuum oven typically operates above 1,000° C. (1,832° F.), high-temperature vacuum ovens are thus incompatible with an oven door and an elastomeric door seal. Instead, high-temperature vacuum ovens utilize a plug to seal the interior of the oven and maintain a vacuum within the oven while operating. The plug typically includes a series of plates made of a material which can handle the high temperatures within the oven while maintaining a tight seal. For example, the plates are typically made of materials such as molybdenum, and tungsten. However, these materials have high thermal conductivity. The use of high heat-conducting materials like tungsten, or molybdenum may therefore result in significant heat loss (e.g., up to 40-50%) through heat transfer to the exterior of the oven. Consequentially, the oven's heating system may be required to work harder and thereby increase power demand to maintain the interior of the oven at temperature. Such high-temperature vacuum ovens may therefore be inefficient and costly to operate.

General Description of a Vacuum Oven

The following is a general description intended to provide a basis for understanding several of the features that are discussed herein and their advantages.

Figure 2:
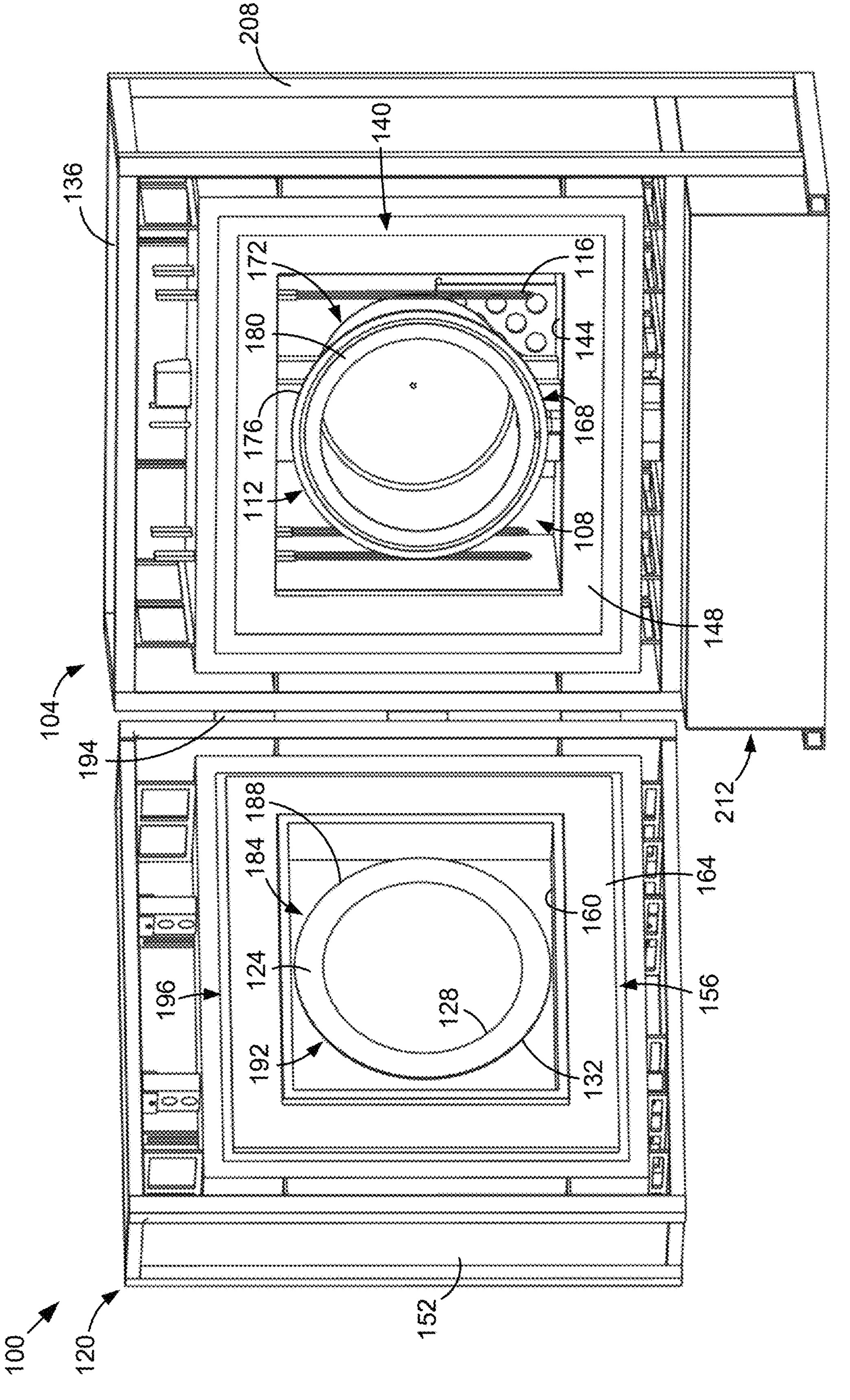
FIG. 2 is a perspective view of the vacuum oven of FIG. 1, with the door in an open position.

Referring to FIGS. 1 and 2, disclosed herein is a high-temperature vacuum oven, referred to generally as vacuum oven 100, which may address one or more of the problems described with respect to existing vacuum ovens. In particular, the vacuum oven 100 may be useable with a door having at least one seal for maintaining a vacuum within the vacuum oven 100, yet nonetheless be operable at temperatures exceeding 1,000° C. (1,832° F.). Further, the vacuum oven 100 may be cheaper to manufacture while also being more efficient and thus lower in cost to operate.

Referring still to FIGS. 1 and 2, the vacuum oven 100 has a thermally insulated housing 104 surrounding a furnace chamber 108. In operation, the vacuum oven 100 further has a retort 112 located within the furnace chamber 108 and at least one heating element 116 located within the furnace chamber 108. The heating element(s) 116 generate the required heat for heat treatment process within the furnace chamber 108. The vacuum oven 100 further includes a door 120. The door 120 is moveable between a closed position (see e.g., FIG. 1) in which the furnace chamber 108 and the retort 112 therein are closed, and an open position (see e.g., FIG. 2) in which the furnace chamber 108 and the retort 112 therein are open.

As shown in FIG. 2, the door 120 includes an inner seal 124. When the door 120 is in the closed position, the inner seal 124 is compressed against the retort 112. In this way, when the door 120 is in the closed position, the inner seal 124 forms an airtight seal between the interior of the retort 112 and the furnace chamber 108. The inner seal 124 has an inner perimeter 128 and an outer perimeter 132. When the door 120 is in the closed position and the inner seal 124 is compressed against the retort 112, the inner perimeter 128 is exposed to the interior of the retort 112, and the outer perimeter 132 is exposed to the exterior of the retort 112. The exterior to which the outer perimeter 132 of the inner seal 124 is exposed may be an enclosed volume including the furnace chamber 108 or a sub-compartment thereof. In operation, the interior of the retort 112 may be placed under a vacuum. This may protect the inner perimeter 128 of the inner seal 124 from deterioration through oxidation at high temperature. Similarly, in operation, the enclosed volume exterior of the retort 112 may be placed under a vacuum and/or filled with an inert gas. This may protect the outer perimeter 132 of the inner seal 124 from deterioration through oxidation at high temperature.

Accordingly, in contrast to existing vacuum ovens, the vacuum oven 100 may advantageously be useable with the door 120 and at least one inner seal 124 to maintain a vacuum within the vacuum oven 100, yet nonetheless be operable at temperatures exceeding 1,000° C. (1,832° F.). Further, in contrast to the plug of existing high-temperature vacuum ovens, the door 120 itself need not function as a seal since the design of the vacuum oven 100 enables the use of a dedicated inner seal 124. Accordingly, the door 120 may advantageously be made of materials that are both lower in cost and in thermal conductivity. Therefore, in contrast to the plug of existing high-temperature vacuum ovens, the vacuum oven 100 may advantageously be cheaper to manufacture and more energy and cost efficient to operate.

Detailed Description of a Vacuum Oven

Figure 3:
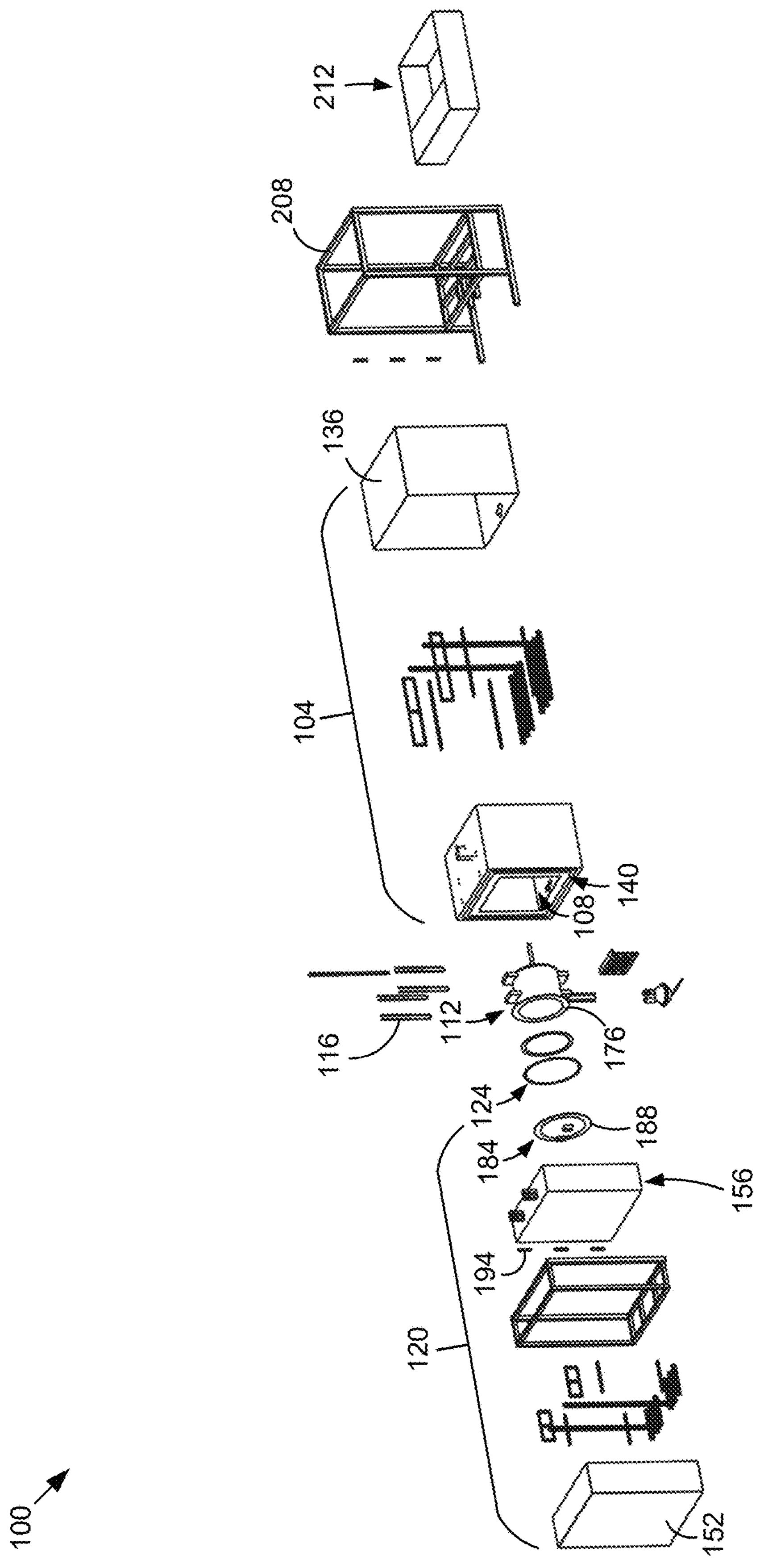
FIG. 3 is a perspective exploded view of the vacuum oven of FIG. 1; and, FIG. 4 is a perspective cross-sectional view of the vacuum oven of FIG. 1 taken along line 4-4 of FIG. 1.

Referring to FIGS. 2 and 3, as shown, the insulated housing 104 may be of any design and may include a metal housing 136 and a thermal insulation layer. The metal housing 136 may be made of any suitable material. For example, the metal housing 136 may be made of a heat-resistant material such as stainless steel or refractory alloys. The insulated housing 104 further includes a thermal insulation layer, referred to generally as housing insulation 140, located interior of the metal housing 136. The housing insulation 140 may be made of any suitable material. For example, the housing insulation 140 may be made of fire brick, a castable refractory alloy, or any other material with a suitably high heat resistance and low thermal conductivity.

As shown in FIG. 2, the housing insulation 140 has an inner surface 144 that faces into the furnace chamber 108. Optionally, the inner surface 144 of the housing insulation 140 may be sealed by a ceramic coating such as, for example, fibrous ceramic insulation. A ceramic coating may advantageously minimize any inert gas introduced into the furnace chamber 108 from penetrating into the housing insulation 140. The housing insulation 140 further has an outer face 148 which faces the door 120 when the door 120 is in the closed position (see FIG. 2). Optionally, the outer face 148 of the housing insulation 140 may, in addition or in the alternative to the inner surface 144, be sealed by a ceramic coating.

As further shown in FIG. 2, the door 120 may form a front end of the insulated housing 104. The door 120 may therefore also be referred to as an openable end of the insulated housing 104. As shown, the door 120 includes a metal housing 152 and a thermal insulation layer, referred to generally as door insulation 156, located interior of the metal housing 152. The metal housing 152 and the door insulation 156 may be any material as described with respect to the metal housing 136 and housing insulation 140 of the insulated housing 104 (e.g., a continuation of the same materials).

As shown, the door insulation 156 has an inner surface 160 that faces into the furnace chamber 108. The door insulation 156 also has an inner face 164 which faces the insulated housing 104 when the door 120 is in the closed position. As such, when the door 120 is in the closed position, the inner face 164 of the door insulation 156 may face or abut the outer face 148 of the housing insulation 140, and the inner surface 144 of the housing insulation 140 and the inner surface 160 of the door insulation 156 may together bound the furnace chamber 108. In this way, when the door 120 is in the closed position (see e.g., FIG. 1), the furnace chamber 108 may be closed and enclosed by insulation. The door 120 or the door insulation 156 may therefore also be referred to as an openable end of the furnace chamber 108.

The inner surface 160 and/or the inner face 164 of the door insulation 156 may optionally be sealed by a ceramic coating as described previously with respect to the housing insulation 140.

Referring again to FIGS. 2 and 3, the vacuum oven 100 includes at least one heating element 116 within the furnace chamber 108. The heating element(s) 116 may be carefully controlled to achieve the precise temperature needed for the material processing within the retort 112. Any number of heating elements 116 may be used. In the example shown, four heating elements 116 are disposed within the furnace chamber 108, with two heating elements 116 on each side of the retort 112. Such a layout may ensure relatively even heat distribution across the retort 112 and the contents thereof.

Any suitable heating elements 116 and arrangement of heating elements 116 may be used. For example, the heating elements 116 may be electrical heating elements. The heating elements 116 may be made of any suitable material such as, for example, molybdenum disilicide ($MoSi_2$), which is able to withstand high temperatures (e.g., up to 1,800° C. (3,272° F.) or more) while maintaining stability. Any other material may be used for the heating elements 116 that has sufficient thermal stability and, if operating while exposed to air, resistance to oxidation at high temperatures.

Figure 4:
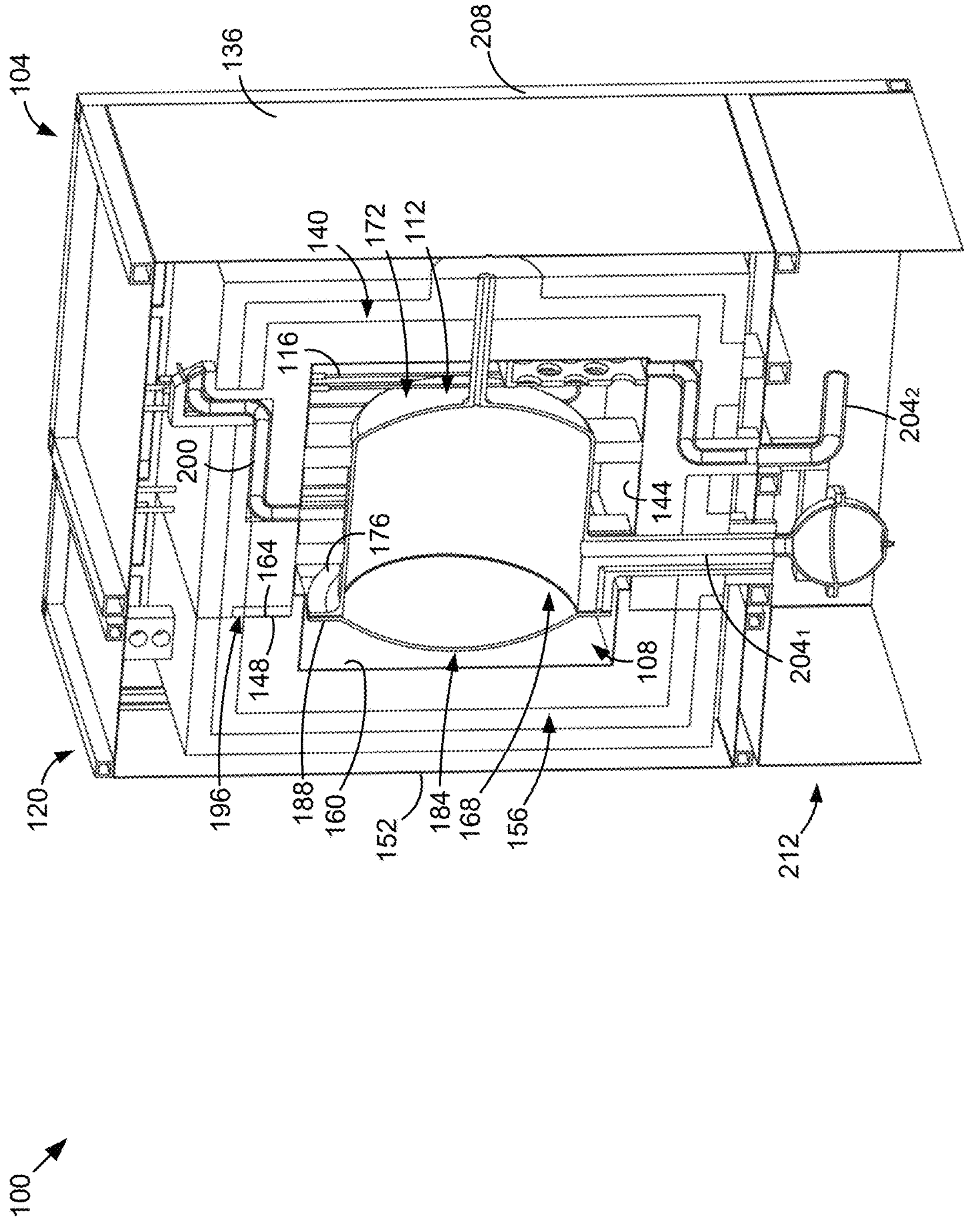

Referring to FIGS. 2 to 4, the retort 112 of the vacuum oven 100 is located within the furnace chamber 108. The retort 112 serves as a sealable vessel or chamber within which materials are subject to heat treatment processes in a controlled environment. The retort 112 has an open end 168 and an opposed distal end 172. The open end 168 includes a retort flange 176 having an outer face 180 which, when the door 120 is in the closed position, faces the door 120. When the door 120 is in the open position, the open end 168 of the retort 112 is accessible for loading/unloading the contents interior of the retort 112. The retort may be removable receivable in the furnace chamber 108.

The door 120 may form a front end of the retort 112. For example, as exemplified, the door 120 includes a lid 184 for the retort 112 that may be secured to the inner surface 160 of the door insulation 156. The lid 184 is positioned such that, when the door 120 is in the closed position, the lid 184 closes the open end 168 of the retort 112. In the example shown, the lid 184 includes a lid flange 188 having an inner face 192 which, when the door 120 is in the closed position, faces the outer face 180 of the retort flange 176. The lid 184 may therefore also be referred to as an openable end of the retort 112.

As described in greater detail subsequently, the retort 112 may be connected to a vacuum source to generate a vacuum within the interior of the retort 112. As also described in greater detail subsequently, in some embodiments, the furnace chamber 108 may also be connected to a vacuum source to generate a vacuum exterior of the retort 112. In such embodiments, the retort 112 and the lid 184 therefor may be made of a refractory material such as molybdenum and/or tantalum. That is, in such embodiments, since the interior and exterior the retort 112 is in a vacuum, the retort 112 and the lid 184 may advantageously be made of such refractory materials, which may otherwise oxidize rapidly in air at high temperature. In other embodiments, regardless of whether the furnace chamber 108 is placed under a vacuum, the retort 112 and the lid 184 may be made of a ceramic material such as alumina, zirconium, tungsten carbide, graphite, or silicone carbide. Such materials do not require vacuum exterior of the retort 112. An advantage of alumina is that molten metal spills may not interact with the walls of the retort 112 since alumina will not alloy with any material. The lid 184 may be made of the same material as the retort 112 or optionally different material.

The door 120 may therefore be moveable between a closed position (see e.g., FIG. 1) in which the furnace chamber 108 is closed by the door 120 and the retort 112 is closed by the lid 184, and an open position (see e.g., FIG. 2) in which the furnace chamber 108 and the retort 112 are open. The door 120 may be moveable relative to the insulated housing 104 between the closed position and the open position by any suitable means. For example, the door 120 may be rotatably mounted, translatably mounted, or removably mounted to the insulated housing 104. In the example shown, the door 120 is rotatably mounted to the insulated housing 104 by hinges 194.

Referring again to FIG. 2, as shown, an inner seal 124 is provided on the inner face 192 of the lid flange 188. In this way, when the door 120 is in the closed position, the inner seal 124 is compressed between the inner face 192 of the lid flange 188 and the outer face 180 of the retort flange 176. In alternate embodiments, the inner seal 124 may be provided on the outer face 180 of the retort flange 176. In either embodiment, when the door 120 is in the closed position, the inner seal 124 may thus form an airtight seal between the interior of the retort 112 and the furnace chamber 108 exterior of the retort 112.

The inner seal 124 may, as shown, be in the form of an O-ring around the perimeter of the lid 184 on the lid flange 188 (or, alternatively, around the perimeter of the open end 168 of the retort 112 on the retort flange 176). The inner seal 124 may cover at least a portion of the radial thickness of the lid flange 188/retort flange 176. Optionally, as shown, the inner seal 124 may cover the full radial thickness of the lid flange 188/retort flange 176. Optionally, the inner seal may overlie the open end 168 of the retort when the door is in the closed position.

The inner seal 124 may be made of any suitable compressible material capable of forming an airtight seal between the interior and exterior of the retort 112 and withstanding the high temperatures under which the vacuum oven 100 operates (a compressible high temperature seal material). For example, the inner seal 124 may be a compressible graphite (also referred to as soft graphite). Compressible graphite may advantageously tolerate temperatures up to 2,500° C. (4,532° F.) in a non-oxidizing atmosphere. Therefore, unlike elastomeric door seals used in existing vacuum ovens, which can only tolerate a temperature up to about 300° C. (572° F.), an inner seal 124 made of compressible graphite may be employed in the high temperature vacuum oven 100 where the inner seal 124 is not exposed to air.

The inner seal 124 has an inner perimeter 128 and an outer perimeter 132. When the door 120 is in the closed position and the inner seal 124 is compressed against the retort 112, the inner perimeter 128 is exposed to the interior of the retort 112. In operation, the interior of the retort 112 is placed under a vacuum. Therefore, in operation, the inner perimeter 128 of the inner seal 124 may be protected from degradation by oxidation at high temperature. When the door 120 is in the closed position and the inner seal 124 is compressed against the retort 112, the outer perimeter 132 is exposed to the volume around the retort 112. The volume to which the outer perimeter 132 of the inner seal 124 is exposed may be an enclosed volume including the furnace chamber 108 or a sub-compartment within the furnace chamber 108.

For example, a sub-compartment may be only an internal volume in the door that is positioned, e.g., laterally between the inner surface 160 of the door insulation 156 and the inner seal 124 and axially between the retort 112 and the facing wall of the door. In such a case, the sub-compartment may be a sealed volume that is positioned forward of the retort when the door is in the closed position. It will be appreciated that a separate sealed volume may be provided between the retort 112 and the housing insulation 140. Such a separate sealed volume may be provided by, e.g., by extending retort flange 176 to the housing insulation or a separate wall which subdivides the furnace chamber 108.

In any such case, in operation, the enclosed volume or a sub-compartment may be placed under a vacuum. Additionally, or alternatively, the enclosed volume may be in flow communication with a source of an inert gas (e.g., argon). Therefore, in operation, the outer perimeter 132 of the inner seal 124 may be protected from degradation by oxidation at high temperature.

Optionally, the vacuum oven 100 may include a secondary seal 196. The secondary seal 196 may be provided around the inner face 164 of the door insulation 156 and/or around the outer face 148 of the housing insulation 140. In this way, when the door 120 is in the closed position, the secondary seal 196 is compressed between the inner face 164 of the door insulation 156 and the outer face 148 of the housing insulation 140. Accordingly, when the door 120 is in the closed position, the secondary seal 196 may thus form an airtight seal around an enclosed volume, e.g., between the furnace chamber 108 and the exterior of the furnace chamber 108 (i.e., the ambient exterior of the insulated housing 104).

The secondary seal 196 may be made of any suitable compressible material. For example, the secondary seal 196 may be compressible graphite. Optionally, the secondary seal 196 may be at a location on the door insulation 156 or housing insulation 140 that is spaced from the enclosed volume. That is, the secondary seal 196 may be positioned proximate an outer surface of the housing insulation 140 that is opposite the inner surface 144, or proximate an outer surface of the door insulation 156 that is opposite the inner surface 160. Due to the spacing from the enclosed volume and the low thermal conductivity of the housing insulation 140/door insulation 156, the secondary seal 196 may be exposed to relatively low heat. In this way, the secondary seal 196 may be located at a relatively cool location such that an elastomeric material may be used.

The enclosed volume may thus be positioned between the inner seal 124 and the secondary seal 196 and fluidically isolated from both the interior of the retort 112 and the exterior of the insulated housing 104 when the door 120 is in the closed position. The secondary seal 196 may prevent oxygen from entering the enclosed volume from the exterior of the insulated housing 104. Accordingly, the secondary seal 196 may protect the inner seal 124 from new oxygen being introduced into the enclosed volume and causing degradation of the outer perimeter 132 of the inner seal 124.

In some embodiments, the enclosed volume may also be in flow communication with a source of an inert gas. In such embodiments, the secondary seal 196 may also prevent escape of the inert gas to the exterior of the insulated housing 104. Accordingly, the secondary seal 196 may minimize the amount of inert gas needed to be introduced into the enclosed volume.

Referring to FIG. 4, in the embodiment shown, the enclosed volume includes the full furnace chamber 108. As shown, an inert gas supply line 200 outlets into the furnace chamber 108. The inert gas supply line 200 may outlet into the furnace chamber 108 at any location or locations. For example, if the enclosed volume is a sub-compartment of the furnace chamber 108 around the retort flange 176 and the lid flange 188, the inert gas supply line 200 may outlet proximate the outer face 148 of the housing insulation 140.

The inert gas supply line 200 may supply inert gas to the enclosed volume to create a protective atmosphere around the inner seal 124, shielding it from oxygen. In some embodiments, inert gas supply line 200 may also supply inert gas to the enclosed volume to create a protective atmosphere around the retort 112 and/or lid 184 (e.g., if made of a refractory material such as molybdenum and/or tantalum). Any inert gas suitable for preventing oxidation and contamination of the inner seal 124 and providing a non-flammable atmosphere, with sufficient chemical and thermal stability, may be used. For example, the inert gas may be argon or helium.

The inert gas supply line 200 may be used to supply the inert gas to the enclosed volume at any flow rate needed to maintain the protective atmosphere around the inner seal 124 (and, in some embodiments, the retort 112 and/or lid 184). For example, the inert gas may be supplied at a flow rate of less than 1 liter (0.264 gallons) per minute (e.g., less than 0.5 liters (0.132 gallons) per minute, less than 0.3 liters (0.079 gallons) per minute, or more particularly less than 0.1 liters (0.026 gallons) per minute). The flow rate may depend, for example, on the size of the enclosed volume (i.e., the full furnace chamber 108 or a sub-compartment thereof) and the suction rate at which any vacuum source draws air from the enclosed volume throughout the heat treatment process. It will be appreciated that the inert gas may be supplied prior to heating of the oven and/or subsequent to commencement of the heating of the oven. Further, once an inert atmosphere is provided in the enclosed volume, the supply of inert gas may be terminated or inert gas may continue to be supplied, continuously or intermittently while the furnace is at an elevated temperature.

Referring to FIGS. 3 and 4, the vacuum oven 100 may further includes at least one vacuum source (not shown). The vacuum source may be used to generate a vacuum within the retort 112, the enclosed volume within the furnace chamber 108, or both. Accordingly, a first vacuum source may be used to generate a vacuum within the retort 112 and a second vacuum source may be used to generate a vacuum within the enclosed volume. Alternatively, a single vacuum source may be used to generate a vacuum within both the retort 112 and the enclosed volume.

As shown, a first vacuum line $\mathbf{204}_1$ connects the interior of the retort 112 with a vacuum source (not shown) and a second vacuum line 2042 connects the enclosed volume with a vacuum source (not shown). Optionally, the vacuum source to which the interior of the retort 112 is connected may be a first vacuum source and the vacuum source to which the enclosed volume is connected may be a second vacuum source. In such embodiments, the interior of the retort 112, the first vacuum line $\mathbf{204}_1$, and the first vacuum source may be fluidically isolated from the enclosed volume, the second vacuum line 2042, and the second vacuum source. In this way, the vacuum sources may operate concurrently, sequentially etc. to generate a vacuum within the interior of the retort 112 and the enclosed volume.

In some embodiments, such as where the housing insulation 140 and the door insulation 156 do not have a ceramic coating on the inner surfaces 144, 160 thereof, the material of the housing insulation 140 and/or the door insulation 156 may release oxygen at high temperatures. Therefore, in such embodiments, the vacuum within the enclosed volume may become contaminated during heat treatment processes. Accordingly, in such embodiments, the second vacuum source may operate to maintain a non-oxidizing environment within the enclosed volume throughout the heat treatment process by drawing out any new oxygen released by the housing insulation 140 and/or the door insulation 156.

In alternate embodiments, the vacuum source to which the interior of the retort 112 is connected and the vacuum source to which the enclosed volume is connected may be a common vacuum source. That is, the first vacuum line $\mathbf{204}_1$ and the second vacuum line 2042 may connect to a single vacuum source. In such embodiments, the common vacuum source may operate to concurrently generate a vacuum within the interior of the retort 112 and the enclosed volume. In embodiments in which the enclosed volume may become contaminated by the material of the housing insulation 140 and/or the door insulation 156 releasing oxygen at high temperatures, a valve may be provided to selectively connect the common vacuum source with the first vacuum line $\mathbf{204}_1$, the second vacuum line 2042, or both. The valve may be actuated by any means, such as manually or automatically (e.g., electro-mechanical actuator). In this way, the common vacuum source may operate to generate a vacuum within the interior of the retort 112 and the enclosed volume concurrently or sequentially. Additionally, the common vacuum source may subsequently be connected to the enclosed volume only. In this way, the common vacuum source may operate to maintain a non-oxidizing environment within the enclosed volume throughout the heat treatment process by drawing out any new oxygen released by the housing insulation 140 and/or the door insulation 156.

The vacuum source(s) may be provided at any location. For example, as shown, the insulated housing 104 is supported on a frame 208 above a vacuum source housing 212. As shown, the first vacuum line $\mathbf{204}_1$ extends from the interior of the retort 112 to the vacuum source housing 212 and the second vacuum line 2042 extends from the enclosed volume to the vacuum source housing 212. Within the vacuum source housing 212, the first vacuum line $\mathbf{204}_1$ and the second vacuum line 2042 may connect to a single vacuum source or respective vacuum sources housed within the vacuum source housing 212.

By generating a vacuum at the inner perimeter 128 of the inner seal 124 and generating and maintaining a vacuum and/or inert atmosphere at the outer perimeter 132 of the inner seal 124, the vacuum oven 100 may employ the inner seal 124 under a high temperature. This may advantageously enable the door 120 to be insulated as described herein and enable heat to be applied to the door 120 without significant heat loss. For example, the vacuum oven 100 as described herein may have at least 20% less heat loss (e.g., at least 30% less heat loss, or more particularly at least 40% less heat loss) than existing high-temperature vacuum ovens. The vacuum oven 100 may therefore have lower operating costs.

Additionally, this design of the vacuum oven 100 may provide a more even distribution of heat across the retort 112 and the contents therein. For example, in operation at steady state condition, the distal end 172 of the retort 112 may be at a first temperature and the open end 168 of the retort 112 may be at a second temperature that is at least 85% of the first temperature (e.g., at least 90%, or more particularly at least 95% or more). A high-temperature vacuum oven is used for heat treatment processes in a vacuum environment at temperatures typically above 1,000° C. (1,832° F.) up to 2,000° C. (3,632° F.) or more. The second temperature may thus be at least 85% of the first temperature, and the first temperature may be over 1,000° C. This minimal temperature gradient may improve heat treatment processes through a more even heat distribution across the heated material. This minimal temperature gradient may also allow the use of low-cost materials such as alumina or zirconia for the retort 112. As described previously herein, such materials may crack due to stresses induced by a larger temperature gradient such as that experienced in existing high-temperature vacuum ovens. Accordingly, the vacuum oven 100 described herein may be cheaper to manufacture, cheaper to operate, and have better heat treatment process outcomes than existing vacuum ovens and high-temperature vacuum ovens.

While the above description provides examples of the embodiments, it will be appreciated that some features and/or functions of the described embodiments are susceptible to modification without departing from the spirit and principles of operation of the described embodiments. Accordingly, what has been described above has been intended to be illustrative of the invention and non-limiting and it will be understood by persons skilled in the art that other variants and modifications may be made without departing from the scope of the invention as defined in the claims appended hereto. The scope of the claims should not be limited by the preferred embodiments and examples, but should be given the broadest interpretation consistent with the description as a whole.

The invention claimed is:

1. A vacuum oven comprising:

(a) a furnace chamber provided in a thermally insulated housing;

(b) a retort which, in operation, is located within the furnace chamber, the retort having an open end and an opposed distal end, the open end having an opening;

(c) a door moveable between a closed position in which the open end of the retort is closed and an open position in which the retort is accessible, the door having an outer side wherein the outer side of the door is thermally insulated;

(d) an inner vacuum seal which, when the door is in the closed position, seals around the opening of the open end of the retort whereby an inner perimeter of the inner vacuum seal faces into and is exposed to an interior of the retort and an outer perimeter of the inner vacuum seal faces into and is exposed to an enclosed volume within the furnace chamber that is exterior to the retort; and, (e) a heating element, wherein, in operation at steady state condition, the distal end of the retort is at a first temperature and the open end of the retort is at a second temperature, the second temperature is at least 85% of the first temperature and the first temperature is over 1,000° C. and, wherein the inner vacuum seal comprises a seal material that is thermally stable at a temperature of at least 850° C.

2. The vacuum oven of claim 1 wherein the inner vacuum seal comprises compressible graphite.

3. The vacuum oven of claim 2 wherein the inner vacuum seal is compressible graphite.

4. The vacuum oven of claim 1 wherein the door comprises a lid, the lid comprises a ceramic and, when the door is in the closed position, the inner vacuum seal is positioned between the retort and the lid.

5. The vacuum oven of claim 4 wherein a first vacuum line connects the interior of the retort with a first source of vacuum and a second vacuum line connects the enclosed volume with a second source of vacuum.

6. The vacuum oven of claim 5 herein the retort consists of at least one of zirconia, silicon carbide, molybdenum and tantalum.

7. The vacuum oven of claim 1 wherein, when the door is in the closed position and the vacuum oven is in operation, the enclosed volume is in flow communication with a source of an inert gas and/or is under vacuum.

8. The vacuum oven of claim 7 wherein a first vacuum line connects the interior of the retort with a first source of vacuum and a second vacuum line connects the enclosed volume with the first source of vacuum.

9. The vacuum oven of claim 8 wherein the first vacuum line and the second vacuum line are selectively connectable with the first source of vacuum.

10. The vacuum oven of claim 8 wherein the retort consists of at least one of zirconia, silicon carbide, molybdenum and tantalum.

11. The vacuum oven of claim 1 wherein, when the door is in the closed position, a secondary seal seals around the enclosed volume.

12. The vacuum oven of claim 11 wherein, when the door is in the closed position, the secondary seal engages the insulated housing.

13. The vacuum oven of claim 12 wherein the secondary seal comprises an elastomeric material.

14. The vacuum oven of claim 13 wherein the insulated housing comprises a metal housing and insulation located interior of the metal housing, the insulation having an outer face which faces the door when the door is in the closed position and the outer face is coated with ceramic.

15. The vacuum oven of claim 14 wherein the secondary seal engages the insulation.

16. The vacuum oven of claim 1 further comprising a secondary seal and, when the door is in the closed position, the enclosed volume is provided between the inner vacuum seal and the secondary seal and the enclosed volume is in flow communication with a source of an inert gas.

17. The vacuum oven of claim 16 wherein the insulated housing comprises a metal housing and insulation located interior of the metal housing and the secondary seal engages the insulation.

18. The vacuum oven of claim 17 wherein a first vacuum line connects the interior of the retort with a first source of vacuum and a second vacuum line connects the enclosed volume with a second source of vacuum.

19. The vacuum oven of claim 18 wherein the retort consists of molybdenum and/or tantalum.

20. The vacuum oven of claim 16 wherein a first vacuum line connects the interior of the retort with a first source of vacuum and a second vacuum line connects the enclosed volume with the first source of vacuum.

21. The vacuum oven of claim 20 wherein the first vacuum line and the second vacuum line are selectively connectable with the first source of vacuum.

22. The vacuum oven of claim 20 wherein the retort consists of molybdenum and/or tantalum.

23. The vacuum oven of claim 20 wherein the retort comprises alumina.

* * * * *